United States Patent [19]
Bock

[11] 3,790,108
[45] Feb. 5, 1974

[54] REDUNDANT STABILIZER CONTROL

[75] Inventor: John W. Bock, Long Beach, Calif.

[73] Assignee: McDonnell Douglas Corporation, Santa Monica, Calif.

[22] Filed: Nov. 13, 1972

[21] Appl. No.: 306,377

[52] U.S. Cl. .............................. 244/83 D, 74/469
[51] Int. Cl. ........................................ B64c 13/04
[58] Field of Search..244/75, 83 R, 83 A, 83 B, 83 C, 244/83 D, 83 E, 86, 89; 74/469, 470, 471 R, 479, 480 R

[56] References Cited
UNITED STATES PATENTS

| | | | |
|---|---|---|---|
| 2,528,752 | 11/1950 | Jacobus | 244/83 D |
| 3,733,039 | 5/1973 | O'Connor et al. | 244/83 D |

Primary Examiner—Duane A. Reger
Assistant Examiner—Jesus D. Sotelo
Attorney, Agent, or Firm—Robert O. Richardson; Walter J. Jason; Donald L. Royer

[57] ABSTRACT

A redundant control system for operating two flight control surfaces such as a rotatable stabilizer and an elevator rotatably mounted thereon whereby in the event of either control surface mechanically jamming, the preselected control system may still be used to actuate the unjammed control surface.

9 Claims, 5 Drawing Figures

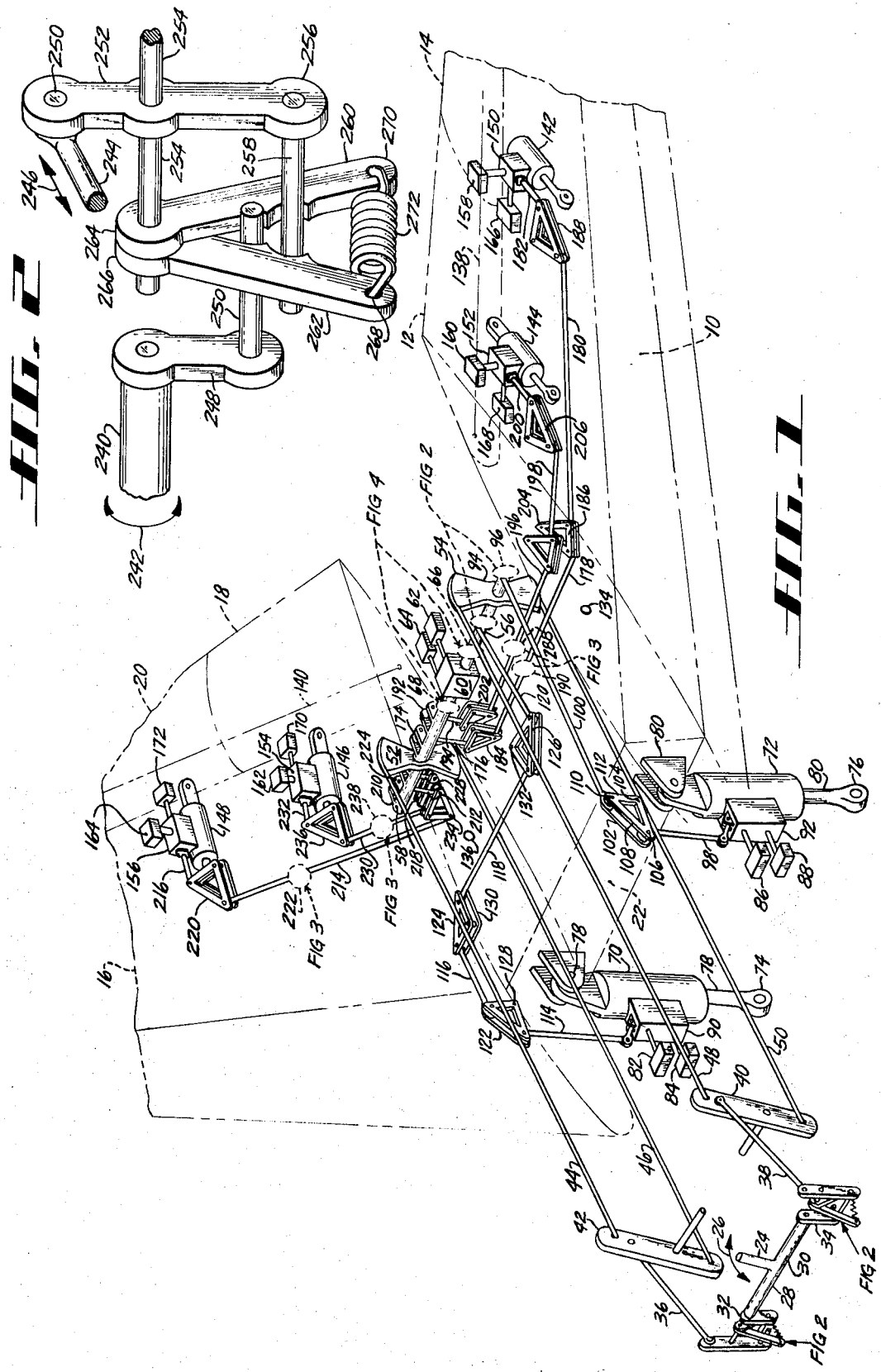

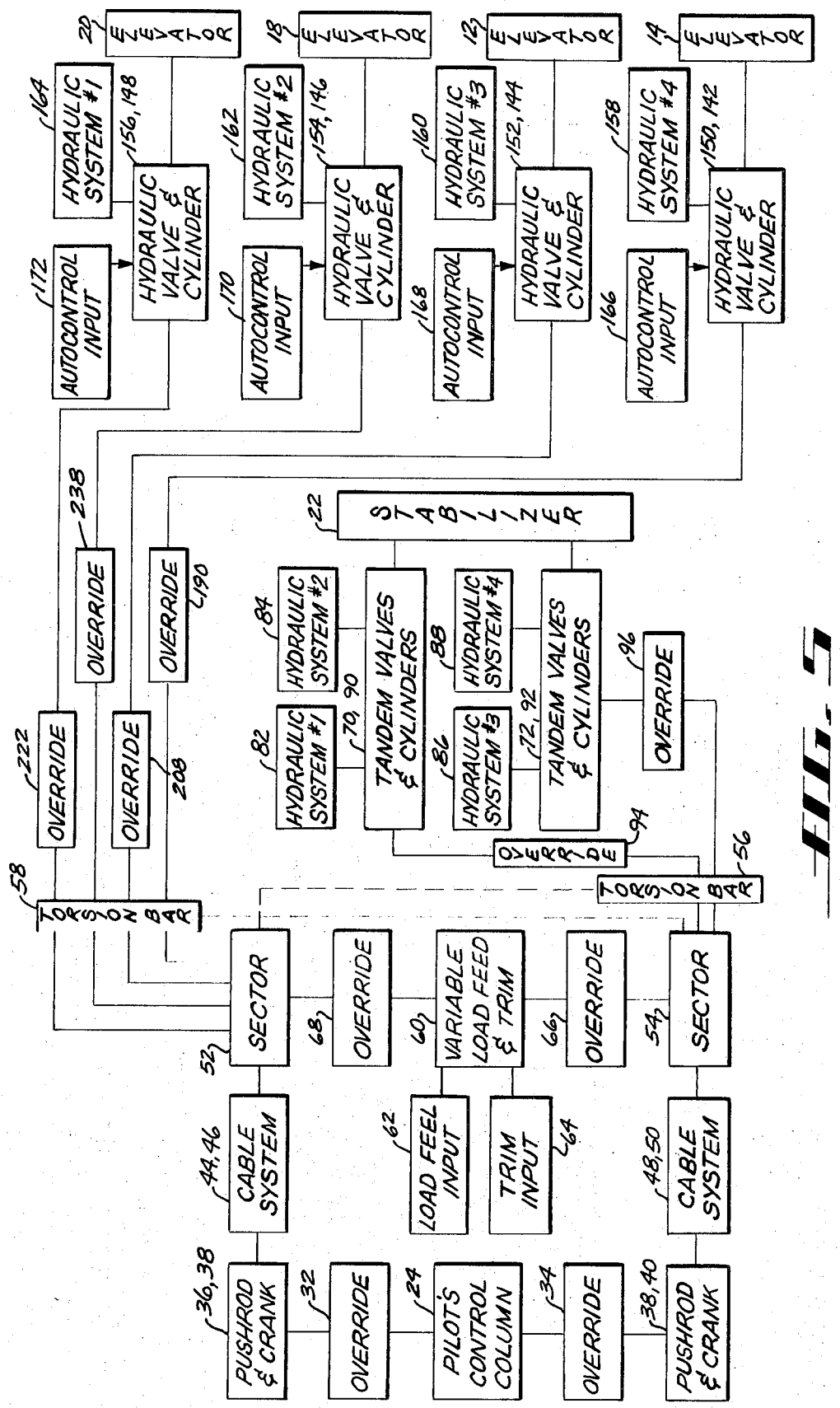

REDUNDANT STABILIZER CONTROL

BACKGROUND OF THE PRESENT INVENTION

Most aircraft have horizontal stabilizers at the rear area of the aircraft. These stabilizers may be varied somewhat in their pitch attitude or angle of attack on the airstream for trim purposes. These stabilizers have a rear portion pivotally connected to them which are called elevators. These elevators are the control surfaces normally operated by the pilot in the operation of the aircraft such as in takeoff, landing, ascending and descending and for other maneuvers.

SUMMARY OF THE PRESENT INVENTION

In contrast to the conventional system which uses the horizontal stabilizer for trim purposes and the elevators for control, the flying tail concept incorporating the present invention uses the horizontal stabilizer for both trim and control with the elevators geared to the stabilizer through a mechanical linkage. The horizontal stabilizer provides the elevator function and the elevators are used for trim purposes. There are advantages to the flying tail system, particularly in the STOL (short takeoff and landing) aircraft operation. It is within the flying tail system that the present invention is utilized and described in the following illustrative embodiment.

In this embodiment the stabilizer is driven by multiple hydraulic actuators and the elevators are also driven by hydraulic actuators. The input linkage from the pilot to the actuators is such as to result in an elevator stabilizer program that would be identical to that of conventional stabilizers. In the event of a jam of any one of the control surfaces, the input to the actuator is taken up by an override spring and the remaining surfaces continue to function. The redundant stabilizer control system of the present invention includes a stabilizer driven by one or several actuators, one or several elevator or tab surfaces driven by their own actuator or actuators, a command system operated by the pilot, an override device in the input linkage to each actuator, an auto-control system (optional) with input to each elevator or tab actuator, and a feel device and trim device with (optional) override spring between them and the remainder of the system. For pilot operation the pilot's command input is transmitted through cables or linkage to the stabilizer actuators and elevator or tab actuators. If required to overcome control sensitivity problems, the linkage may be non-linear to permit most of the initial movement to be provided by the elevator or tab. Load, feel and trim may be provided as desired.

In the event of a jam of the stabilizer or its actuators, the override devices between the pilot's command linkage and the stabilizer actuators absorbs the motion of the pilot input and the remaining elevators or tabs continue to be actuated to fly the airplane. The stabilizer and all other surfaces continue to operate. Additional override devices may be used to protect the system against jams of the feel and trim devices. As an option, the auto-control input may be to each individual elevator or tab actuator. This input operates the effected actuator and its elevator or tab surface. This input also causes a motion of the pilot command linkage associated with the actuator. The linkage motion drives the stabilizer drive actuators, causing the stabilizer to move as a result of autopilot input in addition to the elevators or tabs. This method of accepting autopilot commands at the actuators of individual elevators or tabs provides a simpler and more reliable autopilot control than is likely if multiple inputs and a monitoring device is used to actuate a single stabilizer surface as in the case of conventional stabilizer systems.

BRIEF DESCRIPTION OF THE DRAWINGS

FIG. 1 is a schematic illustration of the controls with the stabilizer and elevator in phantom lines to show their relationship, FIGS. 2, 3 and 4 are perspective views of various forms of override jam compensating devices, and FIG. 5 is a block diagram illustration of the system.

DETAILED DESCRIPTION OF ILLUSTRATIVE EMBODIMENT

Figure 3:
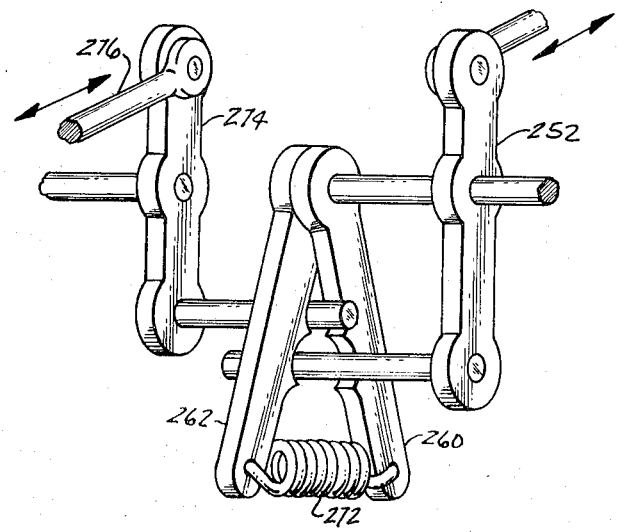

In FIG. 1 there is shown in phantom lines the left stabilizer 10 with a pair of elevators 12, 14 pivotally connected on the trailing edge, and the right stabilizer 16 with a pair of elevators 18, 20 pivotally connected on its trailing edge. There are appropriate stabilizer connections 22 connecting the stabilizers so that their leading edges may be rotated together when the angle of attack is adjusted as desired. This raising and lowering of the leading edges also changes the angle of the elevators attached to the stabilizers. For safety purposes dual sets of controls are provided throughout the entire control system and override provisions are made so that in the event of jamming or malfunctioning of any of the stabilizer or elevator structures, the remaining structures not only will perform their functions but they will also compensate for the non-workable ones.

The control structure schematically shown in FIG. 1 can best be described with reference to the functional block diagrams shown in FIG. 5. Starting with the pilot's control column 24 which initiates a fore and aft movement shown by double arrow 26, torsion rods 28, 30 extend laterally to override devices 32, 34. These devices are of the type shown in FIG. 2 which converts rotational movement to a longitudinal movement providing that a reactive longitudinal movement force (as in a jam or malfunction) does not prevent such longitudinal movement. In the event such a force appears on override device 34, for example, this force will not appear in opposition to the rotational force on torsion rod 30, and does not interfere with the operability of the override device 32 that converts the rotation of rod 28 to a longitudinal force output. The structure of the override devices will be described hereinafter with reference to the structure shown in FIGS. 2, 3 and 4 but the foregoing brief functional description is deemed adequate in describing the systems in FIGS. 1 and 5.

The output from overrides 32, 34 are longitudinal movements of pushrods 36, 38 which cause rotation of cranks 40, 42 by which cables 44, 46 and 48, 50 attached thereto are actuated. The other ends of cables 44, 46 are attached to sectors 52, and the other ends of cables 48, 50 are attached to sectors 54. These sectors are mounted on and cause rotation of torsion bars 56, 58. A variable load feel and trim unit 60, receiving signals from a load feel input device 62 and a trim input device 64 also send rotational forces to the torsion bars 56, 58 through override units 66 and 68. These override units provide torsion-to-torsion coupling as will be explained hereinafter with reference to the override unit in FIG. 4.

Sector 54 initiates movement of the stabilizer by actuation of hydraulic cylinders 70, 72 attached between aircraft cabin structure (not shown) at pivot points 74, 76 and stabilizer connector 22 at pivot points 78, 80. The elongation and contraction of piston rods 78, 80 within cylinders 70, 72 is accomplished by fluid flow from hydraulic systems 82, 84 and 86, 88 regulated through valves 90, 92. These valves are mechanically controlled by linkages through override units 94, 96 coupled to torsion bar 56 which is rotated by either or both of sectors 52 and 54. Override units 94, 96 are of the type to be described hereinafter with reference to FIG. 2.

Linkage between valve 92 and override unit 96 consists of pushrods 98, 100 angularly coupled through a sector 102 pivotally connected at 104 to stabilizer connector 22. Pushrod 98 is pivotally connected at 106 to link 108 of sector 102 and pushrod 100 is pivotally connected at 110 to link 112 of the sector. In this manner horizontal longitudinal movement of pushrod 100 may be translated to vertical longitudinal movement of pushrod 98 for actuation of valve 92. This linkage, of course, is only one of many forms of transmission of forces between override unit 96 and valve 92. Throughout the system other sectors and pushrods are shown and will be briefly mentioned in their description since they all function substantially in the same manner as the linkage just described.

The linkage between valve 90 and override unit 94 consists of pushrods 114, 116, 118, 120 interconnected by sectors 122, 124 and 126, as shown, to provide a change in direction as needed to make the connection. Sectors 122, 124, 126 are pivotally mounted at pivot points 128, 130, 132 to some part of the stabilizer, not shown. Thus it can be seen that either set of cables 44, 46 or 48, 50 will cause actuation of either cylinder 70, 72 to pivot the stabilizer connector 22 (and hence left and right stabilizers 10 and 16) about pivot points 134, 136.

Elevators 12 and 14 are pivotally connected to left stabilizer 10 along center line 138 and elevators 18 and 20 are pivotally connected to right stabilizer 16 along center line 140. Hydraulic actuators 142, 144, 146 and 148 are adapted to pivot the elevators relative to the stabilizers upon which they are mounted. Valves 150, 152, 154 and 156 control actuators 142, 144, 146 and 148 respectively by regulating fluid flow from hydraulic systems 158, 160, 162 and 164 respectively.

Signals from an autopilot for an auto-control input 166, 168, 170, 172 may be used to control valves 150, 152, 154 and 156 or they may be controlled by torsion bar 58 through appropriate pushrods and sectors.

Torsion bar 58 has a crank arm 174 to which valve 150 is connected for actuation by pushrods 176, 178, 180, 182 and sectors 184, 186 and 188. An override device 190 of the type shown in FIG. 3 is placed in pushrod 178. Torsion bar 58 has a crank arm 192 to which valve 152 is connected for actuation by pushrods 194, 196, 198, 200 and sectors 202, 204 and 206. Override device 208 of the type shown in FIG. 3 is placed in pushrod 196. Torsion bar 58 has a crank arm 210 to which valve 156 is connected for actuation by pushrods 212, 214, 216 and sectors 218 and 220. Override device 222 in pushrod 214 is of the type shown in FIG. 3. Torsion bar 58 has a crank arm 224 to which valve 154 is connected for actuation by pushrods 228, 230, 232 and sectors 234, 236. Override device 238 in pushrod 230 is of the type shown in FIG. 3.

Reference is now made to the override device shown in FIG. 2. Here a torque tube 240 which rotates as shown by double arrow 242 is the input and pushrod 244 which moves longitudinally as shown by double arrow 246 is the output. Attached to torque tube 240 is a crank arm 248 having a crank pin 250 extending therefrom. Pushrod 244 is pivotally mounted at one end 250 to a crank 252 which rotates on axle 254. At the other end 256 of crank 252 is a crank pin 258. Straddling pins 250 and 258 are a pair of retainer legs 260, 262 pivotally mounted at their top ends 264, 266 on axle 254 and held together at their bottom ends 268, 270 by a connecting spring 272.

In operation assume that torque tube 240 rotates clockwise as does crank arm 248 and crank pin 250. This moves the lower end 268 of retainer leg 262 clockwise. Spring 272 causes leg 260 to follow, moving crank pin 258 in front of it. This causes lower end 256 of crank 252 to rotate clockwise, pulling pushrod 244 to the right.

Now, suppose some movable structure to which pushrod 244 is connected jams and pushrod 244 cannot move. Crank pin 258 prevents rotation of leg 260 and spring 272 stretches, permitting arm 262 to rotate with the rotation of torque tube 240. Thus, a jam causing the output to be zero will still permit an input force to occur.

Figure 4:
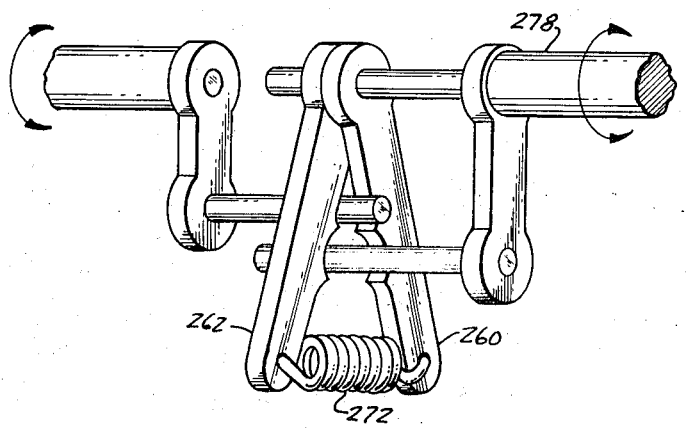

Briefly, the embodiments in FIGS. 3 and 4 are link-to-link and torsion bar-to-torsion bar override devices which operate in a manner similar to the unit in FIG. 2 just described. Thus a crank 274 with pushrod 276 is the input force in FIG. 3 and torque tube 278 is the output force in FIG. 4. Otherwise the structure of these override units is the same as that in FIG. 2.

Having thus described an illustrative embodiment of the present invention, it is to be understood that modifications thereof will become apparent to those skilled in the art and that these deviations are to be construed as part of the present invention.

I claim:

1. A redundant stabilizer control system comprising:

a stabilizer pivotally mounted to an aircraft,
stabilizer actuator means for raising and lowering the leading edge of said stabilizer,
first linkage means for actuating said stabilizer actuator means,
said linkage means having an override device therein to disrupt forces through said linkage means from actuating said stabilizer when jamming of said stabilizer occurs,
said stabilizer having a plurality of elevator sections attached thereto and adapted for relative movement therewith,
elevator actuator means for moving said elevator sections relative to said stabilizer,
second linkage means for actuating said elevator actuator means,
said second linkage means having an override device therein to disrupt forces through said linkage means from actuating said elevators when jamming of said elevators occurs, and
pilot control means for actuating both said linkage means.

2. A redundant stabilizer control system as in claim 1 wherein said pilot control means includes
a torsion bar connected to said linkage means, and
cable means operable to rotate said linkage means.

3. A redundant stabilizer control system as in claim 1 wherein said second linkage means includes separate linkages to each of said elevator sections and each of said linkages has an override device therein to disrupt actuating forces to their corresponding associated elevator sections when opposing forces caused by jamming and malfunctioning oppose and exceed said actuating forces.

4. A redundant stabilizer control system as in claim 1 wherein said stabilizer actuator means includes a pair of actuators, each of said actuators being controlled through separate linkages and each of said linkages has an override device therein for disrupting actuating forces through said linkages when jamming and malfunctioning occurs.

5. A redundant stabilizer control system as in claim 1 wherein said override devices include a resilient connection which receives without transmitting actuating forces when there are opposing forces due to jamming and malfunctioning.

6. A redundant stabilizer control system as in claim 5 wherein at least one of said override devices is connected to a rotational force input and a longitudinal movement pushrod linkage output, said one of said devices including a pair of legs pivotally mounted at one of their ends and connected at the other of their ends by spring means, said rotational input causing one of said legs to rotate, said spring means causing the other of said legs to rotate in the absence of opposing jamming and malfunctioning forces, said other of said legs being connected to said pushrod linkage to cause longitudinal movement thereof.

7. A redundant stabilizer control system as in claim 5 wherein at least one of said override devices is connected to a pushrod linkage adapted for a longitudinal movement input, said one of said devices including a pair of legs pivotally mounted at one of their ends and connected at the other of their ends by spring means, said longitudinal movement input causing one of said legs to rotate, said spring means causing the other of said legs to rotate in the absence of opposing jamming and malfunctioning forces, and
means operable by said other of said legs to actuate control surfaces associated therewith.

8. A redundant stabilizer control system as in claim 7 wherein said means is a torsion rod adapted for rotational movement.

9. A redundnt stabilizer control system as in claim 7 wherein said means is a pivotal crank for imparting longitudinal movement to a pushrod attached thereto.

* * * * *